UNITED STATES PATENT OFFICE.

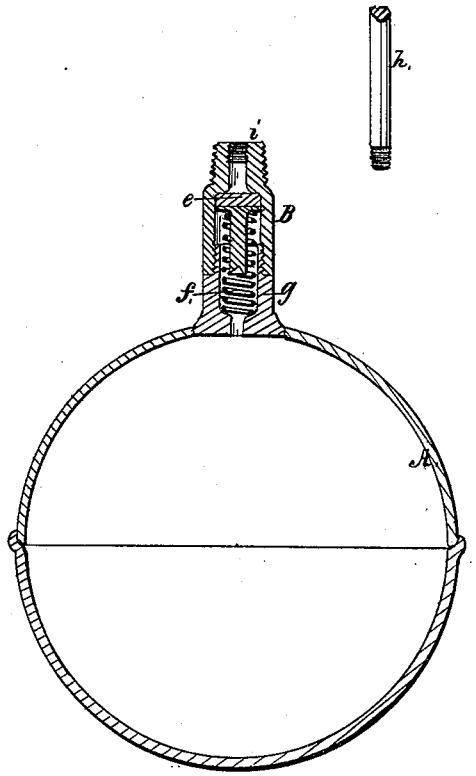
F. A. Hoyt,
Steam-Boiler Indicator.
Nº 14,959.  Patented May 27, 1856.

F. A. HOYT, OF BOSTON, MASSACHUSETTS.

FLOAT FOR STEAM-BOILERS.

Specification of Letters Patent No. 14,959, dated May 27, 1856.

*To all whom it may concern:*

Be it known that I, F. A. HOYT, of Boston, in the county of Suffolk and State of Massachusetts, have invented certain new and useful Improvements in Hollow Metallic Floats for Steam-Boilers, of which the following is a full, clear, and exact description, reference being had to the annexed drawing, in which is represented a section through the center of a float with my improvements attached.

The floats heretofore employed within steam boilers for water gages and for other purposes, are liable to be collapsed and broken by the pressure to which they are subjected, and the difficulty in the way of making them sufficiently strong to resist this pressure, arises from the fact that their efficiency is impaired by any increase of weight. A float therefore that shall at the same time be light and possess the necessary strength to enable it to resist the external pressure, has long been a desideratum.

To accomplish this end, is the object of my present improvement, which consists in counteracting a portion of the pressure upon the exterior of the float by charging it with compressed air previous to its use within the boiler, whereby I am enabled to employ thinner metal for the manufacture of the floats, and effectually to avoid the danger of collapsing or of leakage caused by excessive strain upon the joints.

To enable others skilled in the art to make and use my improved float, I will proceed to describe the manner in which it is constructed and operated.

In the accompanying drawing, A, is the float, to the hollow stem of which is adapted the cap B. This cap contains an elastic valve $e$, which is kept upon its seat by the spring $f$. Thus constructed, the ball is filled by means of a suitable force pump, with compressed air, a pressure being put upon the inside of the ball equal to about one half that to which the outside is subjected. The joint at $g$, is then immediately closed with solder and the rod $h$, through which its motion is to be transferred to the indicating apparatus is screwed or driven into the hole $i$. The joint at this point is then more securely closed with solder and the float is ready for use.

Suppose 140 lbs. to be the greatest pressure to which the float is ever to be subjected, it is then constructed of material that shall be capable of resisting rather more than half this pressure either internally or externally applied without exploding or collapsing, it is then filled with compressed air as above described until it is subjected to an internal pressure of about 70 lbs.; when afterward in use it be subjected to an external pressure of 140 lbs. a great part of this pressure is neutralized by the pressure within as the 70 lbs. within the ball is somewhat increased by the expansion of the air within the float caused by the heat within the boiler.

I am thus enabled to make use of an exceedingly light float and to apply the same directly to the indicating apparatus without the use of intermediate levers and without the necessity of counterbalancing the float.

What I claim as my invention and desire to secure by Letters Patent is—

Charging the float with compressed air for the purpose substantially herein specified.

F. A. HOYT

Witnesses:
P. E. TESCHEMACHER,
THOS. R. ROACH.